US012345019B2

(12) United States Patent
Nakajima et al.

(10) Patent No.: US 12,345,019 B2
(45) Date of Patent: Jul. 1, 2025

(54) HYDRAULIC CONTROL SYSTEM IN WORKING MACHINES

(71) Applicant: Caterpillar SARL, Geneva (CH)

(72) Inventors: Hideki Nakajima, Akashi (JP); Koichi Kiyasu, Akashi (JP); Toshikazu Koga, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/287,702

(22) PCT Filed: Apr. 20, 2022

(86) PCT No.: PCT/EP2022/025160

§ 371 (c)(1),
(2) Date: Oct. 20, 2023

(87) PCT Pub. No.: WO2022/223151

PCT Pub. Date: Oct. 27, 2022

(65) Prior Publication Data

US 2024/0183128 A1 Jun. 6, 2024

(30) Foreign Application Priority Data

Apr. 22, 2021 (JP) ................................ 2021-072376

(51) Int. Cl.
*E02F 9/22* (2006.01)
*F15B 13/04* (2006.01)

(52) U.S. Cl.
CPC .......... *E02F 9/2203* (2013.01); *E02F 9/2267* (2013.01); *E02F 9/2292* (2013.01); (Continued)

(58) Field of Classification Search
CPC ..... E02F 9/2292; E02F 9/2296; E02F 9/2239; F15B 11/17; F15B 13/0401
See application file for complete search history.

(56) References Cited

U.S. PATENT DOCUMENTS

2012/0291427 A1* 11/2012 Azuma .................. E02F 3/966 60/420
2017/0227028 A1* 8/2017 Ueda ...................... F15B 11/17
(Continued)

FOREIGN PATENT DOCUMENTS

JP 2002339908 A * 11/2002 ........... E02F 9/2239
JP 2008082107 A 4/2008
WO 2002095240 A1 11/2002

OTHER PUBLICATIONS

International Search Report related to Application No. PCT/EP2022/025160; reported on Sep. 8, 2022.

*Primary Examiner* — Thomas E Lazo

(57) ABSTRACT

In optional control circuit commonly used among multiple optional hydraulic actuators, it is necessary to enable back pressure reduction, part reduction, and downsizing when a breaker is mounted as an optional hydraulic actuator. A normal control region, where the discharge valve passage to the oil tank has an opening area of normal control range, and a back pressure reduction region, where the discharge valve passage has the back pressure reduction opening Aw whose opening area is larger than the maximum opening area in the normal control range, are installed at the operating position of optional control valve for controlling discharge flow rate of optional hydraulic actuator; when the optional hydraulic actuator is the breaker, the optional control valve is positioned at the back pressure reduction region (W), when the optional hydraulic actuator is not the breaker, the valve is positioned at the normal control region.

4 Claims, 7 Drawing Sheets

(52) U.S. Cl.
CPC ........ *F15B 13/0401* (2013.01); *E02F 9/2285* (2013.01); *E02F 9/2296* (2013.01)

(56) References Cited

U.S. PATENT DOCUMENTS

| | | | | |
|---|---|---|---|---|
| 2019/0292753 | A1 | 9/2019 | Oka et al. | |
| 2020/0024825 | A1* | 1/2020 | Futakami .................. | E02F 3/96 |

* cited by examiner

HYDRAULIC CONTROL SYSTEM IN WORKING MACHINES

CROSS-REFERENCE TO RELATED APPLICATION

This application is a 35 USC § 371 US National Stage filing of International Application No. PCT/EP2022/025160 filed on Apr. 20, 2022 which claims priority under the Paris Convention to Japanese Patent Application No. 2021-072376 filed on Apr. 22, 2021.

FIELD OF THE INVENTION

The present invention relates to a technical field of hydraulic control system used in working machines such as a hydraulic excavator.

BACKGROUND OF THE INVENTION

In general, some working machines such as hydraulic excavator are configured to be capable of selectively attaching multiple optional hydraulic actuators. For example, a hydraulic excavator is capable of removably mounting hydraulic breaker, crusher, and others in place of a bucket used for a general purpose as a working attachment.

When installing a hydraulic circuit for the optional hydraulic actuator in a hydraulic circuit of working machines, it is required that the circuit should be commonly used among multiple optional hydraulic actuators for space saving and cost reduction, and it is also required that the circuit should support a specific control depending on individual optional hydraulic actuator. When mounting a breaker as the optional hydraulic actuator, for example, since higher back pressure will weaken the driving force of the breaker and degrade a striking performance, the hydraulic circuit needs to reduce the back pressure of the breaker.

Therefore, conventionally, a configuration is known which installs a control valve (optional valve) commonly used among multiple optional hydraulic actuators (crushing cylinder and breaker cylinder) to supply pressure oil to them, and also installs a selection valve in a return oil passage from the optional hydraulic actuator, so that, when the optional hydraulic actuator is the crushing cylinder, the selection valve is switched to feed return oil from the crushing cylinder into the control valve, and when the optional hydraulic actuator is the breaker cylinder, the return oil from the breaker cylinder is directly fed into an oil tank so as to reduce the back pressure during the breaker operation (see FIG. 8 in PTL 1); another known configuration also installs the control valve commonly used among multiple optional hydraulic actuators to supply pressure oil to them and discharge oil from them, and also installs the selection valve (or valve used as both selection valve and relief valve) in the return oil passage from the control valve, so that, when the optional hydraulic actuator is the crushing cylinder, the selection valve is switched to feed return oil from the control valve via an oil cooler into the oil tank, and when the optional hydraulic actuator is the breaker cylinder, the return oil from the control valve is directly fed into the oil tank without passing through the oil cooler so as to reduce the back pressure (see FIGS. 1 to 5 in PTL 1).

PRIOR ART DOCUMENTS

Patent Documents

PTL 1: Japanese Unexamined Patent Application Publication No. 2008-82107

SUMMARY OF INVENTION

Problems to be Solved by the Invention

However, all configurations in the PTL 1 above need the selection valve in addition to the control valve, and the configuration in FIG. 8 in the PTL 1 has a problem that, since a large flow of return oil from the breaker is fed via the selection valve into the oil tank without any resistance for reducing the back pressure, the selection valve and the pipe from the selection valve to the oil tank need to be larger. Also, in the configurations in FIGS. 1 to 5 in PTL 1, the return oil from the breaker flows via the control valve to the selection valve, the control valve is commonly used among multiple optional hydraulic actuators, and the control valve is to control the supply/discharge flow for a double-acting cylinder when the double-acting cylinder such as the crushing cylinder is mounted, so a throttle is installed in the discharge valve passage for the control valve, thus the return oil from the breaker also passes through the throttle of the control valve, unable to reduce the back pressure; this is a problem to be solved by this invention.

Means for Solving the Problem

This invention is created for the purpose of solving the problem in consideration of current condition mentioned above; a claim 1 of this invention provides a hydraulic control system in a working machine installed with an optional control circuit commonly used among multiple optional hydraulic actuators selectively mounted to the working machine; wherein the optional control circuit is installed with an optional flow control valve controlling a supply flow rate from a hydraulic pump to the optional hydraulic actuator, and an optional control valve controlling a discharge flow rate from the optional hydraulic actuator to an oil tank as well as changing over supply/discharge directions of hydraulic oil for the optional hydraulic actuator, so that the supply and discharge flow rates of the optional hydraulic actuator may be configured to be controlled independently of each other; wherein at an operating position of the optional control valve, a normal control region, where a discharge valve passage from the optional hydraulic actuator to the oil tank has an opening area preset out of normal control range, and a back pressure reduction region are provided where the discharge valve passage has a back pressure reduction opening whose opening area is larger than a maximum opening area in the normal control range; wherein the optional control circuit is installed with a control means, which, when the optional hydraulic actuator is a specific hydraulic actuator which is prespecified to need a back pressure reduction, positions the optional control valve in the back pressure reduction region during a running of the optional hydraulic actuator, and when the optional hydraulic actuator is not the specific hydraulic actuator, positions the optional control valve in the normal control region.

The claim 2 of this invention is the hydraulic control system in the working machine as claimed in claim 1, the hydraulic control system in the working machine comprises first and second hydraulic pumps as hydraulic supply source for optional hydraulic actuator and other hydraulic actuator installed in the working machine; wherein, as optional flow control valve, the optional control circuit comprises optional first flow control valve controlling to feed a supply flow for optional hydraulic actuator from the first hydraulic pump to optional control valve and optional second flow control valve controlling to feed the supply flow for optional hydraulic actuator from the second hydraulic pump to optional control valve.

The claim 3 of this invention is the hydraulic control system in a working machine installed with an optional control circuit commonly used among multiple optional hydraulic actuators selectively mounted to the working machine; wherein the optional control circuit is installed with an optional control valve controlling a supply flow rate from hydraulic pump to the optional hydraulic actuator and a discharge flow rate from the optional hydraulic actuator to an oil tank as well as changing over supply/discharge directions of hydraulic oil for the optional hydraulic actuator; wherein at the operating position of the optional control valve, a normal control region, where a discharge valve passage from the optional hydraulic actuator to the oil tank has an opening area preset out of normal control range, and a back pressure reduction region are provided where the discharge valve passage has a back pressure reduction opening whose opening area is larger than a maximum opening area in the normal control range; wherein the optional control circuit is installed with a control means, which, when the optional hydraulic actuator is a specific hydraulic actuator which is prespecified to need a back pressure reduction, positions the optional control valve in the back pressure reduction region during a running of the optional hydraulic actuator, and when the optional hydraulic actuator is not the specific hydraulic actuator, positions the optional control valve in the normal control region.

The claim 4 of this invention is the hydraulic control system in the working machine of claim 3 comprising first and second hydraulic pumps as hydraulic supply source for optional hydraulic actuator and other hydraulic actuator installed in the working machine; wherein the optional control circuit is installed with an optional first control valve, which is connected to first hydraulic pump, controls the supply flow rate from the first hydraulic pump to the optional hydraulic actuator and the discharge flow rate from the optional hydraulic actuator to the oil tank, and changes over supply/discharge directions of hydraulic oil for the optional hydraulic actuator, an optional second control valve, which is connected to second hydraulic pump, controls the supply flow rate from the second hydraulic pump to the optional hydraulic actuator and the discharge flow rate from the optional hydraulic actuator to the oil tank, and changes over supply/discharge directions of hydraulic oil for the optional hydraulic actuator; wherein either one of the optional first and second control valves, which is connected to either one of the first and second hydraulic pumps, is the optional control valve defined in claim 3, which is configured to be installed with normal control region and back pressure reduction region, and the other of the optional first and second control valves, which is connected to the other of the first and second hydraulic pumps, is configured to be installed with normal control region only and not to be installed with back pressure reduction region; wherein, when the optional hydraulic actuator is the specific hydraulic actuator, only either one of the optional first and second control valves is configured to control supply/discharge of hydraulic oil for the specific hydraulic actuator and the other hydraulic actuator installed in the working machine is configured to be supplied with pressure oil from the other of the hydraulic pumps.

Favorable Effects of the Invention

According to the invention of claim 1, it is possible to control the back pressure reduction for the specific hydraulic actuator by making use of the optional control valve for controlling the discharge flow rate from the optional hydraulic actuator and changing over the supply/discharge directions for the optional hydraulic actuator, achieving part sharing and energy saving.

According to the invention of claim 2, each supply flow rate from the first and second hydraulic pumps to the optional hydraulic actuator may be individually controlled depending on the supply flow rate required by the optional hydraulic actuator and operating condition of other hydraulic actuator.

According to the invention of claim 3, it is possible to control the back pressure reduction for the specific hydraulic actuator by making use of the optional control valve for controlling the supply/discharge flow rates for the optional hydraulic actuator and changing over the supply/discharge directions, achieving part sharing and energy saving.

According to the invention of claim 4, better interlocking can be ensured between specific and other hydraulic actuators.

DETAILED DESCRIPTION OF THE INVENTION

Now, an explanation is provided below about an embodiment of the present invention based on drawings.

Figure 1:
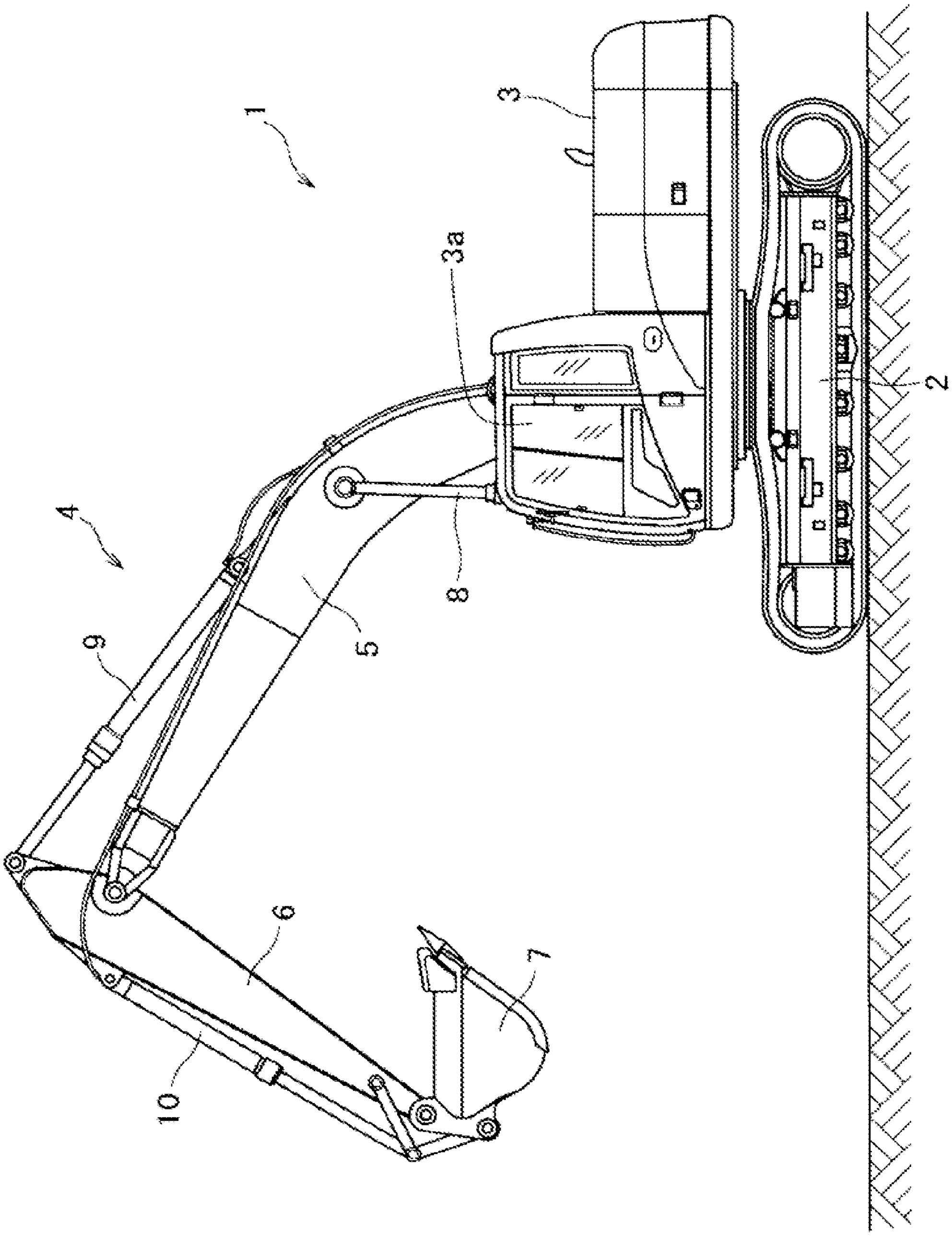
FIG. 1 is a side view of a hydraulic excavator.

First, the explanation about first embodiment of the present invention is provided based on FIGS. 1 to 4; FIG. 1 is the drawing illustrating hydraulic excavator 1 as an example of construction machine according to the present invention, wherein the hydraulic excavator 1 includes a crawler type lower traveling body 2, an upper swiveling body 3 swivelably supported above the lower traveling body 2, and a front working part 4 mounted to the upper swiveling body 3 and others; and the front working part 4 includes a boom 5 whose base end part is supported vertically swingably by the upper swiveling body 3, a stick 6 longitudinally swingably supported on an end part of the boom 5, a bucket 7 swingably attached on the end part of the stick 6, and others; wherein the hydraulic excavator 1 comprises various hydraulic actuators, such as boom/stick/bucket cylinders 8, 9, 10 for swinging the boom 5, stick 6, and bucket 7 respectively, left and right traveling motors (not shown) for moving the lower traveling body 2, and a swiveling motor (not shown) for swiveling the upper swiveling body 3. Furthermore, the hydraulic excavator 1 may selectively mount various optional attachments operating hydraulically, such as the breaker, crusher, grapple, and rotary cutting attachment (none is shown in FIG. 1), in place of the bucket 7 according to a work content. Note that, when the optional attachment is mounted, the bucket cylinder 10 operates as a hydraulic cylinder for swinging the optional attachment against the stick 6.

Figure 2:
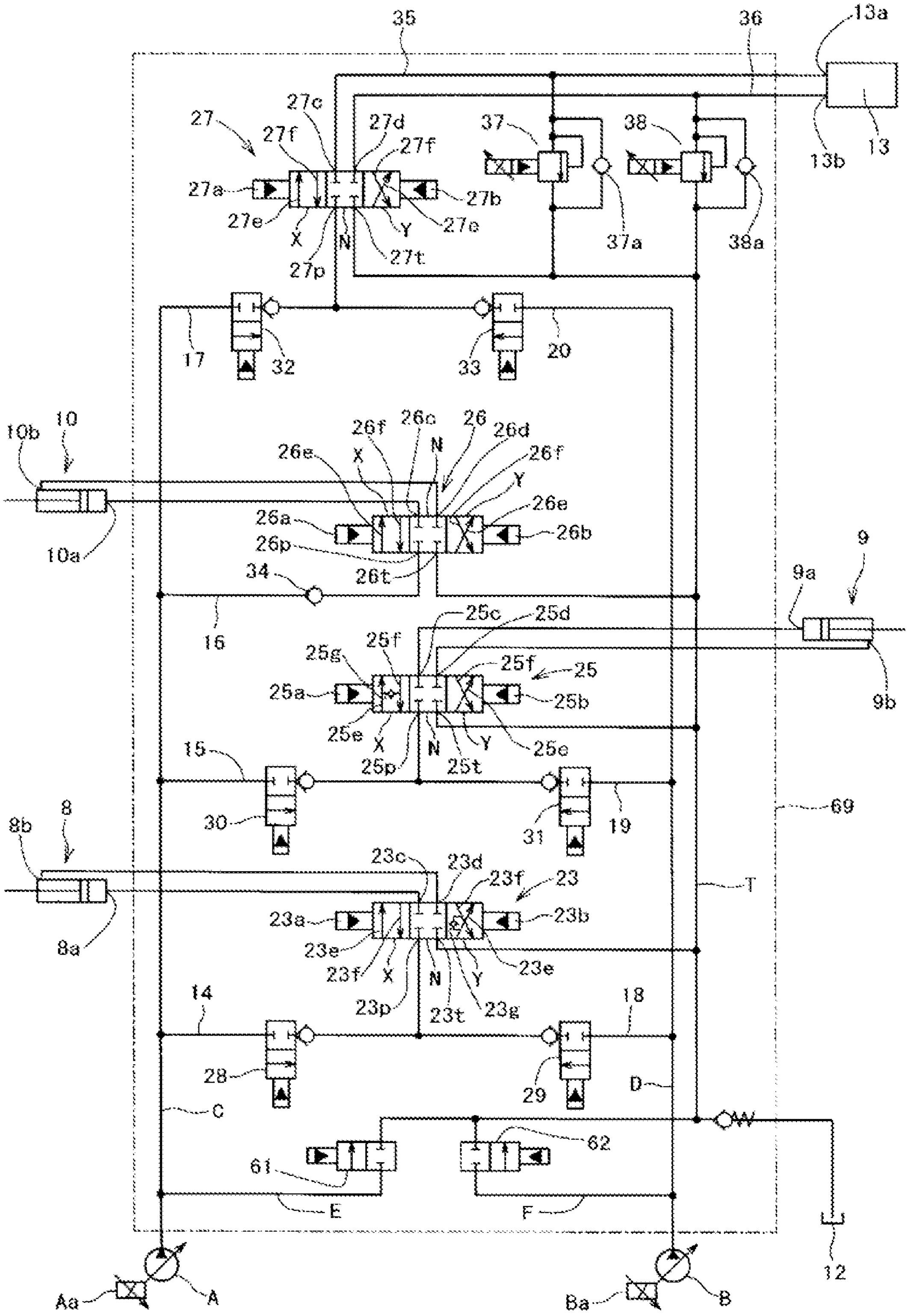
FIG. 2 is a hydraulic circuit diagram illustrating a first embodiment.
Figure 3:
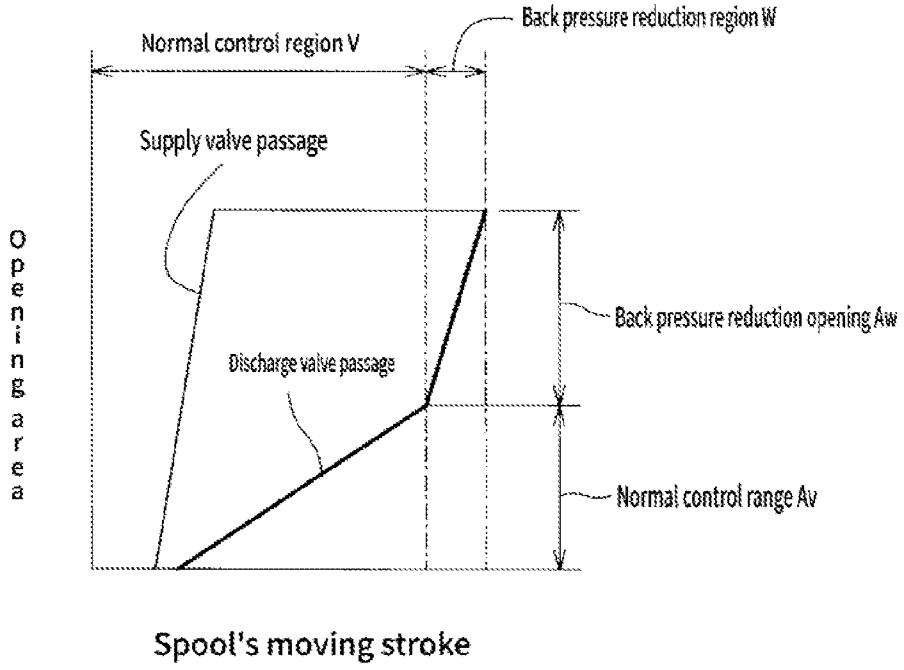
FIG. 3 is a diagram illustrating the relationship between a spool's moving stroke of the optional control valve and the opening area of supply/discharge valve passages at a first operating position according to the first embodiment.

Next, the explanation is provided about the front working part 4 of hydraulic control systems installed in the hydraulic excavator 1 based on the hydraulic circuit diagram shown in the FIG. 2.

In the FIGS. 2, A and B are first and second capacity variable hydraulic pumps, Aa and Ba are variable capacity means for the first and second hydraulic pumps A, B, 12 is an oil tank, 8, 9, and 10 are boom/stick/bucket cylinders, 13 is an optional hydraulic actuator; the optional hydraulic actuator 13 is comprised in the optional attachment in order to drive optional attachment, and when a breaker is mounted as the optional attachment, for example, the actuator 13 is the breaker's optional hydraulic actuator (simply referred to below as breaker), and when the crusher is mounted, the actuator 13 is the crusher's optional hydraulic actuator (simply referred to below as crusher).

Furthermore, C is a first pump line connected to a delivery side of the first hydraulic pump A: a boom's/stick's/bucket's/optional first supply oil passages 14, 15, 16, and 17 are branched out in parallel from the first pump line C. Also, D is a second pump line connected to the delivery side of the second hydraulic pump B; a boom's/stick's/optional second supply oil passages 18, 19, and 20 are branched out in parallel from the second pump line D. The boom's first and second supply oil passages 14, 18 are an oil passage respectively connecting the first and second hydraulic pumps A, B to a boom's control valve 23 described later, the stick's first and second supply oil passages 15, 19 are the oil passage respectively connecting the first and second hydraulic pumps A, B to a stick's control valve 25, the bucket's supply oil passage 16 is the oil passage connecting the first hydraulic pump A to a bucket's control valve 26, and the optional first and second supply oil passages 17, 20 are the oil passage respectively connecting the first and second hydraulic pumps A, B to an optional control valve 27.

Figure 4:
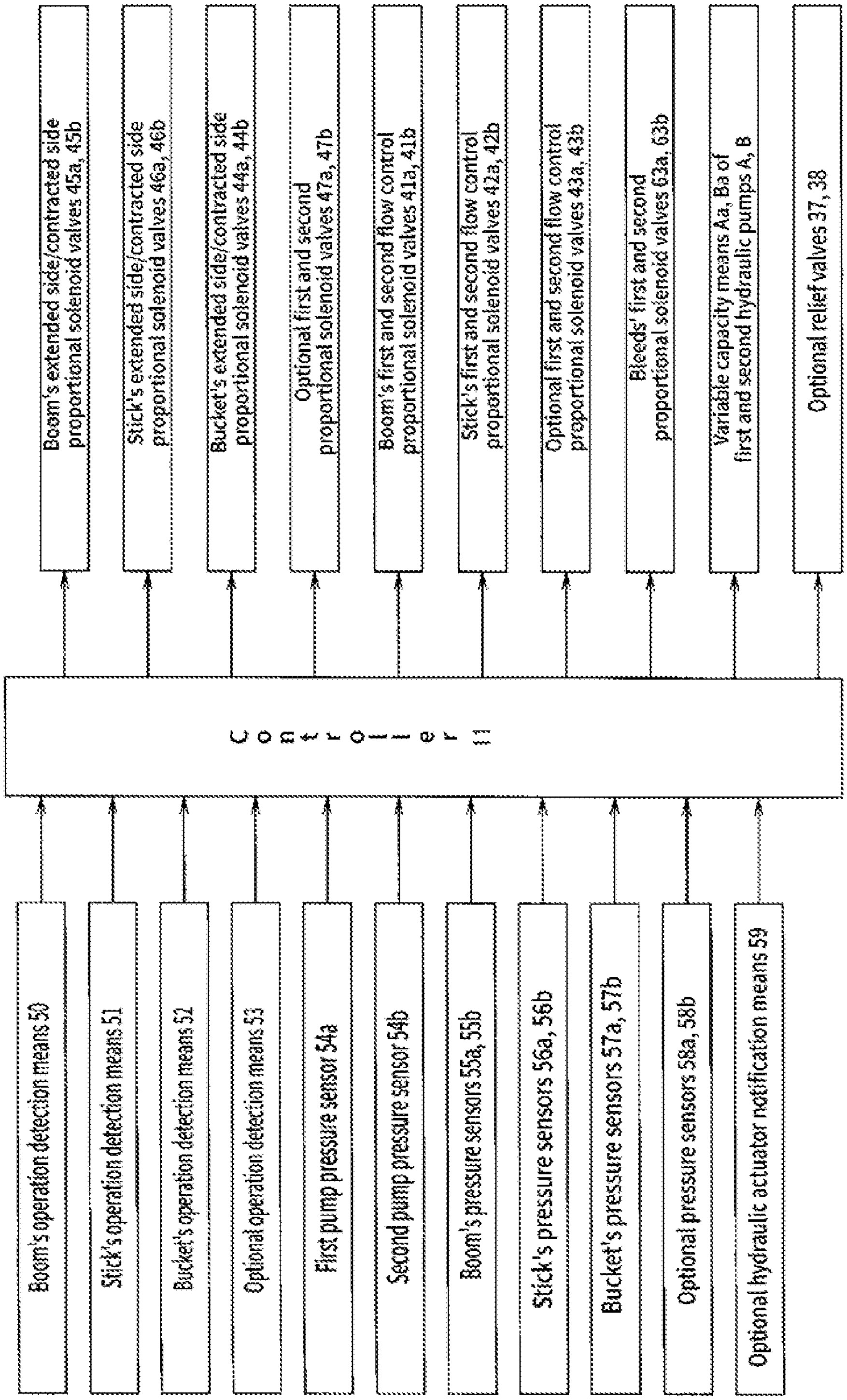
FIG. 4 is the diagram illustrating input/output of controller according to the first embodiment.

Boom's first and second flow control valves 28, 29 are disposed to the boom's first and second supply oil passages 14, 18 for controlling to feed supply flow for the boom cylinder 8 from the first and second hydraulic pumps A, B to the boom's control valve 23, stick's first and second flow control valves 30, 31 are disposed to the stick's first and second supply oil passages 15, 19 for controlling to feed the supply flow for the stick cylinder 9 from the first and second hydraulic pumps A, B to the stick's control valve 25, and optional first and second flow control valves 32, 33 are disposed to the optional first and second supply oil passages 17, 20 for controlling to feed the supply flow for the optional hydraulic actuator 13 from the first and second hydraulic pumps A, B to the optional control valve 27. These boom's/stick's/optional first and second flow control valves 28 to 33 are a poppet valve for the flow control pilot-operated by each flow control proportional solenoid valve (boom's/stick's/optional first and second flow control proportional solenoid valves 41*a*, 41*b*, 42*a*, 42*b*, 43*a*, 43*b*, each is shown in FIG. 4) working based on a control signal output from controller 11, and have such a back flow prevention function that an oil flow from first and second hydraulic pumps A, B to the boom's/stick's/optional control valves 23, 25, and 27 are allowed and a back flow is prevented.

The boom's control valve 23 is disposed at a downstream side of the boom's first and second flow control valves 28, 29, and is supplied with the pressure oil which is controlled (or interrupted) by the boom's first and second flow control valves 28, 29 and merged together from the first and second hydraulic pumps A, B. Also, the stick's control valve 25 is disposed at the downstream side of the stick's first and second flow control valves 30, 31, and is supplied with the pressure oil which is controlled (or interrupted) by the stick's first and second flow control valves 30, 31 and merged together from the first and second hydraulic pumps A, B. The optional control valve 27 is disposed at the downstream side of the optional first and second flow control valves 32, 33, and is supplied with the pressure oil which is controlled (or interrupted) by the optional first and second flow control valves 32, 33 and merged together from the first and second hydraulic pumps A, B.

The respective boom's/stick's/optional control valves 23, 25, and 27 are configured to feed the supply flow as-is from the boom's/stick's/optional first and second flow control valves 28, 29, 30, 31, 32, and 33 to the boom/stick/optional cylinders 8, 9, and 13 without controlling each supply flow rate, as described later.

Meanwhile, the flow control valve is not disposed in the bucket's supply oil passage 16, as described above, and the pressure oil is to be supplied as-is from the first hydraulic pump A via the bucket's supply oil passage 16 to the bucket's control valve 26. Note that a check valve 34 is disposed in the bucket's supply oil passage 16 for allowing the oil flow from the first hydraulic pump A to the bucket's control valve 26 and preventing the back flow.

Next, the explanation is provided about the boom's/stick's/bucket's/optional control valves 23, 25, 26, and 27; first, the explanation is provided about the bucket's control valve 26 which is connected to either one of the first and second hydraulic pumps A, B (first hydraulic pump A according to this embodiment), and is not disposed with the flow control valve at an upstream side.

The bucket's control valve 26 is a closed center spool valve for controlling the supply/discharge flow rates of the bucket cylinder 10 as well as changing over the supply/discharge directions and comprises extended side/contracted side pilot ports 26*a*, 26*b* respectively connected to bucket's extended side/contracted side proportional solenoid valves 44*a*, 44*b* (shown in FIG. 4) for outputting a pilot pressure based on the control signal output from the controller 11, a pump port 26*p* connected to the bucket's supply oil passage 16, a tank port 26*t* connected to a tank line T leading to the oil tank 12, a first actuator port 26*c* connected to a head side port 10*a* on the bucket cylinder 10, and a second actuator port 26*d* connected to a rod side port 10*b* on the bucket cylinder 10. When the pilot pressure is not input into both extended side/contracted side pilot ports 26*a*, 26*b*, the bucket's control valve 26 is positioned at a neutral position N where oil is neither supplied to nor discharged from the bucket cylinder 10; when the pilot pressure is input into the extended side pilot port 26*a*, the valve 26 is configured to be changed over to the extended side operating position X to open the supply valve passage 26*e* from the pump port 26*p* to first actuator port 26*c* and the discharge valve passage 26*f* from second actuator port 26*d* to the tank port 26*t*: also when the pilot pressure is input into the contracted side pilot port 26*b*, the valve 26 is configured to be changed over to the contracted side operating position Y to open the supply valve passage 26*e* from the pump port 26*p* to second actuator port 26*d* and the discharge valve passage 26*f* from first actuator port 26*c* to the tank port 26*t*. When the valve 26 is positioned at extended side or contracted side operating position X or Y, the supply/discharge flow rates for the bucket cylinder 10 are to be controlled by the opening area of supply/discharge valve passages 26*e*, 26*f*, and the opening area is controlled to be increased or decreased depending on the spool's moving stroke associated with an increase or decrease of pilot pressure which is output from the bucket's extended side/contracted side proportional solenoid valves 44*a*, 44*b* to the extended side/contracted side pilot ports 26*a*, 26*b*.

Next, the explanation is provided about the boom's/stick's/optional control valves 23, 25, and 27 connected to both first and second hydraulic pumps A, B and disposed with the flow control valves 28 to 33 at the upstream side.

The boom's control valve 23 is the closed center spool valve for controlling the discharge/recycle flow rates of the boom cylinder 8 as well as changing over the supply/discharge directions and comprises the extended side/contracted side pilot ports 23*a*, 23*b* respectively connected to the boom's extended side/contracted side proportional solenoid valves 45*a*, 45*b* (shown in FIG. 4) for outputting the pilot pressure based on the control signal output from controller 11, the pump port 23*p* connected to the boom's first and second supply oil passages 14, 18, the tank port 23*t* connected to the tank line T, first actuator port 23*c* connected to the head side port 8*a* on the boom cylinder 8, and second actuator port 23*d* connected to the rod side port 8*b* on the boom cylinder 8. When the pilot pressure is not input into both extended side/contracted side pilot ports 23*a*, 23*b*, the boom's control valve 23 is positioned at the neutral position N where the oil is neither supplied to nor discharged from the boom cylinder 8; when the pilot pressure is input into the extended side pilot port 23*a*, the valve 23 is configured to be changed over to the extended side operating position X to open the supply valve passage 23*e* from the pump port 23*p* to first actuator port 23*c* and the discharge valve passage 23*f* from second actuator port 23*d* to the tank port 26*t*: also when the pilot pressure is input into the contracted side pilot port 23*b*, the valve 23 is configured to be changed over to the contracted side operating position Y to open the supply valve passage 23*e* from the pump port 23*p* to second actuator port 23*d*, the discharge valve passage 23*f* from first actuator port 23*c* to the tank port 26*t*, and a recycle valve passage 23*g* which supplies a part of discharge oil as regenerated oil from the first actuator port 23*c* to the second actuator port 23*d*. Here, the opening area of the discharge/recycle valve passages 23*f*, 23*g* is to be controlled to be increased or decreased depending on the spool's moving stroke associated with the increase or decrease of pilot pressure which is output from the boom's extended side/contracted side proportional solenoid valves 45*a*, 45*b* to the extended side/contracted side pilot ports 23*a*, 23*b*, and the discharge/recycle flow rates are to be controlled by controlling to increase or decrease the opening area of the discharge/recycle valve passages 23*f*, 23*g*. The opening area of the supply valve passage 23*e* is configured to fully larger than that of the boom's first and second flow control valves 28, 29 over all moving area from the spool's move start, so that the supply flow rate controlled by the boom's first and second flow control valves 28, 29 is to be supplied as-is to the boom cylinder 8. Thus, the boom control valve 23 is configured to switch the feed/discharge directions for the boom cylinder 8, control the discharge/recycle flow rates from the boom cylinder 8, not control the supply flow rate to the boom cylinder 8, and supply the supply flow as-is controlled by the boom's first and second flow control valves 28, 29 to the boom cylinder 8.

Also, the stick's control valve 25 is the closed center spool valve for controlling the discharge/recycle flow rates of the stick cylinder 9 as well as changing over the supply/discharge directions: since the stick's control valve 25 has a similar structure as the boom's control valve 23 mentioned above, a simple explanation will be provided below; when the pilot pressure is input from the stick's extended side/contracted side proportional solenoid valves 46*a*, 46*b* (shown in FIG. 4) into the extended side/contracted side pilot ports 25*a*, 25*b*, the valve 25 is configured to be changed over from a neutral position N to the extended side/contracted side operating positions X, Y to open the supply valve passage 25*e* from the pump port 25*p* to the actuator port 25*c* or 25*d*, the discharge valve passage 25*f* from actuator port 25*d* or 25*c* to the tank port 25*t*, and further at the extended side operating positions X, also open the recycle valve passage 25*g* which supplies a part of discharge oil from second actuator port 25*d* to first actuator port 25*c* as regenerated oil. The discharge/recycle flow rates are configured to be controlled by the opening area of the discharge/recycle valve passages 25*f*, 25*g* which is increased or decreased depending on the spool's moving stroke: the opening area of the supply valve passage 25*e* is configured to fully larger than that of the stick's first and second flow control valves 30, 31 over all moving area from the spool's move start, so that the supply flow rate controlled by the stick's first and second flow control valves 30, 31 is to be supplied as-is to the stick cylinder 9.

The optional control valve 27 is the closed center spool valve for controlling the discharge flow rate from the optional hydraulic actuator 13 as well as changing over the supply/discharge directions, and comprises the first and second pilot ports 27*a*, 27*b* respectively connected to the optional first and second proportional solenoid valves 47*a*, 47*b* (shown in FIG. 4) for outputting the pilot pressure based on the control signal output from the controller 11, the pump port 27*p* connected to the optional first and second supply oil passages 17, 20, the tank port 27*t* connected to the tank line T, first actuator port 27*c* connected to first port 13*a* on the optional hydraulic actuator 13, and second actuator port 27*d* connected to second port 13*b* on the optional hydraulic actuator 13. When the pilot pressure is not input into both first and second pilot ports 27*a*, 27*b*, the optional control valve 27 is positioned at the neutral position N where oil is neither supplied to nor discharged from the optional hydraulic actuator 13; when the pilot pressure is input into the first pilot port 27*a*, the valve 27 is configured to be changed over to first operating position X to open the supply valve passage 27*e* from the pump port 27*p* to first actuator port 27*c* and the discharge valve passage 27*f* from second actuator port 27*d* to the tank port 27*t*: also when the pilot pressure is input into the second pilot port 27*b*, the valve 27 is configured to be changed over to second operating position Y to open the supply valve passage 26*e* from the pump port 27*p* to second actuator port 27*d* and the discharge valve passage 27*f* from first actuator port 27*c* to the tank port 27*t*. Here, the opening area of the discharge valve passage 27*f* is to be controlled depending on the spool's moving stroke associated with the increase or decrease of pilot pressure which is output from optional first and second proportional solenoid valves 47*a*, 47*b* to first and second pilot ports 27*a*, 27*b*, and the discharge flow rate is to be controlled by controlling the opening area of the discharge valve passage 27*f*, which will be described later in detail. The opening area of the supply valve passage 27*e* is configured to fully larger than that of the optional first and second flow control valves 32, 33 over all moving area from the spool's move start, so that the supply flow rate controlled by the optional first and second flow control valves 32, 33 is to be supplied as-is to the optional hydraulic actuator 13. Thus, the optional control valve 27 is configured to change over the supply/discharge directions for the optional hydraulic actuator 13, control the discharge flow rate from the optional hydraulic actuator 13, not control the supply flow rate to the optional hydraulic actuator 13, and supply the supply flow as-is controlled by the optional first and second flow control valves 32, 33 to the optional hydraulic actuator 13.

There are various types of optional hydraulic actuator 13, such as those (breaker, for example) supplying pressure oil in a single direction, similar to a one-way rotary motor and single-acting cylinder, those (crusher, for example) supplying pressure oil in two directions, similar to a two-way rotary motor and double-acting cylinder, those needing large flow (large scale breaker or crusher, for example), and those needing low flow only (compact breaker or crusher, for example): the optional control valve 27 is commonly used among these various types of optional hydraulic actuator 13. That is, when the optional control valve 27 is changed over to the first and second operating positions X, Y, the pressure oil may be supplied in two directions to optional hydraulic actuator 13: also when either one only of the first and second operating positions X, Y is used, the pressure oil may be supplied in a single direction; and when supplying the pressure oil in a single direction, this embodiment is configured to use first operating position X. As mentioned above, the supply flow controlled by the optional first and second flow control valves 32, 33 is supplied to the optional hydraulic actuator 13; when the optional hydraulic actuator 13 needs large flow rate, both optional first and second flow control valves 32, 33 may be opened to supply the pressure oil from both first and second hydraulic pumps A, B; when only a low flow rate of pressure oil is sufficient, either one of optional first and second flow control valves 32, 33 may be opened and the other may be closed to supply the pressure oil from either one only of the first and second operating positions X, Y. Also, depending on operating condition of other hydraulic actuator (boom cylinder 8, stick cylinder 9, bucket cylinder 10, etc.) using the first and second hydraulic pumps A, B as the hydraulic supply source, the supply flow rate from the first and second hydraulic pumps A, B may be controlled individually by the optional first and second flow control valves 32, 33.

Next, the explanation is provided about the discharge flow control by the discharge valve passage 27*f* for optional control valve 27. As mentioned above, when the pressure oil is supplied in two directions to optional hydraulic actuator 13, the optional control valve 27 uses both first and second operating positions X, Y; when the pressure oil is supplied in a single direction, the valve 27 uses first operating position X only; and the normal control region V and back pressure reduction region W are installed at the first operating position X. In this case, the back pressure reduction region W is configured to have larger spool's moving stroke from the neutral position N than the stroke for normal control region V. In the normal control region V, the opening area of the discharge valve passage 27*f* is configured to increase gradually within a preset normal control range Av as the spool's moving stroke increases, so that the discharge flow rate from the optional hydraulic actuator 13 is configured to increase gradually as the spool's moving stroke increases. Meanwhile, in the back pressure reduction region W, the discharge valve passage 27*f* has the back pressure reduction opening Aw whose opening area is set to further larger than the maximum opening area in the normal control range Av, so that the discharge oil from the optional hydraulic actuator 13 is configured to be fed into the oil tank 12 almost without any resistance and without any flow control (see FIG. 3). In the second operating position Y of the optional control valve 27, the whole spool's moving stroke is normal control region without any back pressure reduction region. As mentioned later, when the optional hydraulic actuator 13 is a specific hydraulic actuator which needs the back pressure reduction, similar to the breaker for example, the back pressure applied to the specific hydraulic actuator may be to be surely reduced by positioning the optional control valve 27 in the back pressure reduction region W at the first operating position X. In this embodiment, the optional control valve 27 corresponds to the optional control valve according to claims 1, 2 of this invention.

Furthermore, 35, 36 are optional first and second actuator oil passages respectively connecting first and second actuator ports 27*c*, 27*d* of the optional control valve 27 and first and second ports 13*a*, 13*b* of the optional hydraulic actuator 13: the optional actuator oil passages 35, 36 are connected to optional relief valves 37, 38 respectively, which, when a pressure of the oil passages 35, 36 rises above a preset pressure, feed the oil in the optional actuator oil passages 35, 36 into the tank line T. The present embodiment has make-up check valves 37*a*, 38*a* as the optional relief valves 37, 38 and adopts a variable relief valve which may change the preset pressure based on the control signal from the controller 11 according to each optional hydraulic actuator 13 to be mounted. Note that the relief valve is connected to the oil passages which respectively connect the boom's/stick's/bucket's control valves 23, 25, 26 and boom/stick/bucket cylinders 8, 9, 10, but the relief valve is omitted in FIG. 2.

Further in FIG. 2, E, F indicate first and second bleed lines respectively branched from an upstream position of all control valves 23, 25, 26 and 27 connected to the first and second pump lines C, D to the tank line T, and first and second bleed valves 61, 62 are respectively disposed on the first and second bleed lines E, F. These first and second bleed valves 61, 62 are to be operated by the pilot pressure output from bleed's first and second proportional solenoid valves 63*a*, 63*b* (shown in FIG. 4) to control the increase or decrease of the bleed flow running from first and second hydraulic pumps A, B through first and second bleed lines E, F to the oil tank 12; and the bleed's first and second proportional solenoid valves 63*a*, 63*b* are to control the increase or decrease of pilot pressure output to the first and second bleed valves 61, 62 based on the control signal output from the controller 11.

As shown in a block diagram of FIG. 4, the controller 11 (corresponds to the control means of this invention) is configured to input the signal (input from the boom's/stick's/bucket's/optional operation detection means 50, 51, 52, and 53 for detecting operating direction and amount respectively of boom's/stick's/bucket's/optional manipulators, first and second pump pressure sensors 54*a*, 54*b* for detecting a pump pressure of first and second hydraulic pumps A, B respectively, boom's/stick's/bucket's pressure sensors 55*a*, 55*b*, 56*a*, 56*b*, 57*a*, and 57*b* for detecting head side/rod side load pressures respectively of the boom/stick/bucket cylinders 8, 9, and 10, optional pressure sensors 58*a*, 58*b* for detecting load pressure of optional actuator oil passages 35, 36 respectively, an optional hydraulic actuator notification means 59 and others), and based on this signal, output control signal (to the boom's/stick's/bucket's/optional extended side/contracted side proportional solenoid valves 45*a*, 45*b*, 46*a*, 46*b*, 44*a*, 44*b*, 47*a*, and 47*b* for outputting pilot pressure to the pilot ports 23*a*, 23*b*, 25*a*, 25*b*, 26*a*, 26*b*, 27*a*, and 27*b* respectively of the boom's/stick's/bucket's/optional control valves 23, 25, 26, and 27, boom's/stick's/optional first and second flow control proportional solenoid valves 41*a*, 41*b*, 42*a*, 42*b*, 43*a*, and 43*b* for outputting pilot pressure to the boom's/stick's/optional first and second flow control valves 28, 29, 30, 31, 32, and 33, bleed's first and second proportional solenoid valves 63*a*, 63*b* for outputting pilot pressure to the first and second bleed valves 61, 62, variable capacity means Aa, Ba of first and second hydraulic pumps A, B, optional relief valves 37, 38, and others), so that the oil supply/discharge control for the boom/stick/bucket cylinders 8, 9, and 10 and optional hydraulic actuator 13, flow control for first and second bleed lines E, F, a delivery flow rate control for first and second hydraulic pumps A, B, preset pressure control of optional relief valves 37, 38, and others are performed. Note that the optional hydraulic actuator notification means 59 is a means to notify the controller 11 of a type, specification, and others of the optional hydraulic actuator 13 when the optional hydraulic actuator 13 is mounted, and in this embodiment, a monitor device (not shown) disposed in a cab 3*a* on the hydraulic excavator 1 is the optional hydraulic actuator notification means 59, so that the controller 11 is notified of the type, specification, and others of the optional hydraulic actuator 13 by operating the monitor device.

Next, the explanation is provided about the control performed by the controller 11.

When a detection signal is input from the boom's/stick's/bucket's/optional operation detection means 50 to 53, the controller 11 calculates the target delivery flow rate according to the increase of operating amount of manipulator based on the detection signal in order to increase the delivery flow rate of hydraulic pumps A, B, and outputs the control signal to variable capacity means Aa, Ba of first and second hydraulic pumps A, B so that the target delivery flow rate may be obtained. Here, the delivery flow rate of first and second hydraulic pumps A, B is controlled individually according to the first and second hydraulic pumps A, B as the hydraulic supply source of hydraulic actuator to be operated.

Moreover, when the detection signal is input from the boom's/stick's/bucket's/optional operation detection means 50 to 53, the controller 11 controls the first and second bleed valves 61, 62 by outputting the control signal to the bleed's first and second proportional solenoid valves 63*a*, 63*b* according to the increase of operating amount of manipulator based on the detection signal in order to decrease the bleed flow (including decreasing bleed flow rate to zero) running from first and second hydraulic pumps A, B to oil tank 12. Here, the bleed flow rate of the first and second bleed lines E, F is controlled individually according to the hydraulic pumps A, B as the hydraulic supply source of hydraulic actuator operated.

Moreover, when the detection signal is input from the boom's/stick's/bucket's/optional operation detection means 50 to 53, the controller 11 controls an oil supply/discharge for the boom/stick/bucket cylinders 8, 9, and 10 and optional hydraulic actuator 13 according to an operation of each manipulator; in this case, as for the bucket cylinder 10 using either one of first and second hydraulic pumps A, B (first hydraulic pump A according to the present embodiment) as hydraulic supply source, the controller 11 calculates its target supply flow rate based on the operation amount of the bucket's manipulator and outputs control signal to the bucket's extended side/contracted side proportional solenoid valves 44*a*, 44*b* so that the opening area of supply valve passage 26*e* for the bucket's control valve 26 may correspond to the target supply flow rate. A spool's moved position which controls the supply flow rate by changing the opening area of supply valve passage 26*e* also controls the discharge flow rate by changing the opening area of discharge valve passage 26*f*.

As for the boom/stick cylinders 8, 9 using both first and second hydraulic pumps A, B as hydraulic supply source, the controller 11 calculates their target supply/discharge flow rates respectively based on the operation amount of the boom's/stick's manipulators. The controller 11 outputs control signal to the boom's/stick's extended side/contracted side proportional solenoid valves 45*a*, 45*b*, 46*a*, and 46*b* so that the opening area of discharge valve passages 23*f*, 25*f* for the boom's/stick's control valves 23, 25 may correspond to the target discharge flow rate. The controller 11 further outputs control signal to the boom's/stick's flow control proportional solenoid valves 41*a*, 41*b*, 42*a*, and 42*b* to control the opening area of boom's/stick's first and second flow control valves 28, 29, 30, and 31 so that total output flow rate from the boom's/stick's first and second flow control valves 28, 29, 30, and 31 may correspond to the target supply flow rate. This enables to supply total supply flow rate as-is controlled by the boom's/stick's first and second flow control valves 28, 29, 30, and 31 through supply valve passage 23*e*, 25*e* for boom's/stick's control valves 23, 25 to the boom/stick cylinders 8, 9. Here, when the target supply flow rate is low or when operating condition of other hydraulic actuator installed in the hydraulic excavator 1 is appropriate, either one only of boom's/stick's first and second flow control valves 28, 29, 30, and 31 may be opened and the other may be closed, thus the pressure oil may be controlled to be supplied from either one only of first and second hydraulic pumps A, B to the boom/stick cylinders 8, 9.

Thus, the boom/stick cylinders 8, 9 using both first and second hydraulic pumps A, B as hydraulic supply source are configured such that the supply flow rate is controlled by the boom's/stick's first and second flow control valves 28, 29, 30, and 31, and the discharge flow rate is controlled by the boom's/stick's control valves 23, 25, so that the supply and discharge flow rates may be controlled independently of each other depending on various types of tasks.

As for the optional hydraulic actuator 13, the controller 11 first determines how to control each optional hydraulic actuator 13 based on the notification signal from the optional hydraulic actuator notification means 59. For example, when the optional hydraulic actuator 13 requires two-way pressure oil supply, the controller 11 controls to change over the optional control valve 27 to first and second operating positions X, Y based on the operating direction of the optional manipulator; when the optional hydraulic actuator 13 requires one-way pressure oil supply only, the controller 11 controls to change over the valve 27 to either one only of the first and second operating positions X, Y (to first operating position X according to the present embodiment). When the optional hydraulic actuator 13 needs large flow rate, the controller 11 controls to open both optional first and second flow control valves 32, 33 to supply the pressure oil from both first and second hydraulic pumps A, B; when only a low flow rate of pressure oil is sufficient, the controller 11 controls to open either one of optional first and second flow control valves 32, 33 and close the other to supply the pressure oil from either one only of the first and second hydraulic pumps A, B.

Furthermore, the controller 11 controls supply/discharge flow rates for the optional hydraulic actuator 13, and for the supply flow rate control, the controller 11 first calculates the target supply flow rate for optional hydraulic actuator 13. When optional hydraulic actuator 13 needs certain amount of supply, the controller 11 sets the certain supply rate as the target supply flow rate, and when the optional hydraulic actuator 13 operates at a rate depending on the operating amount of manipulator, the controller 11 calculates the target supply flow rate depending on the operating amount of manipulator. The controller 11 outputs control signal to optional first and second flow control proportional solenoid valves 43*a*, 43*b* to control the opening area of optional first and second flow control valves 32, 33 so that total output flow rate from the optional first and second flow control valves 32, 33 may correspond to the target supply flow rate. Thus, total flow rate controlled by the optional first and second flow control valves 32, 33 is supplied as-is through supply valve passage 27*e* for optional control valve 27 to optional hydraulic actuator 13. When controlling to open either one only of optional first and second flow control valves 32, 33 and close the other, the output flow rate from either one of the optional first and second flow control valves 32, 33 is controlled to correspond to the target supply flow rate and the flow rate controlled by either one of the optional first and second flow control valves 32, 33 is supplied through supply valve passage 27*e* for optional control valve 27 to optional hydraulic actuator 13.

Meanwhile, as for a discharge flow rate control, the controller 11 first decides based on the signal from optional hydraulic actuator notification means 59 whether the optional hydraulic actuator 13 is specific hydraulic actuator (breaker, for example) which needs the back pressure reduction. When it is decided as specific hydraulic actuator, the controller 11 outputs the control signal to optional first proportional solenoid valve 47*a* to position the optional control valve 27 in the back pressure reduction region W at the first operating position X. Thus, the discharge valve passage 27*f* for optional control valve 27 opens with the opening area of the back pressure reduction opening Aw, and the opening area of the back pressure reduction opening Aw is set to further larger than the maximum opening area in the normal control range Av as mentioned above, so the discharge oil from optional hydraulic actuator 13 is set to be fed into oil tank 12 almost without any resistance, thus preventing back pressure on the optional hydraulic actuator 13.

When the optional hydraulic actuator 13 is not decided as specific hydraulic actuator (no need of back pressure reduction), the controller 11 calculates target discharge flow rate from optional hydraulic actuator 13 to oil tank 12. The controller 11 controls to outputs control signal to optional first and second proportional solenoid valves 47*a*, 47*b* to position the optional control valve 27 in normal control region V at first operating position X or at second operating position Y (a whole is normal control region) so that opening area in the normal control region V at the first operating position X or opening area of discharge valve passage 27*f* at second operating position Y may correspond to the target discharge flow rate.

Thus, the optional hydraulic actuator 13 is configured such that the supply flow rate is controlled by optional first and second flow control valves 32, 33, and the discharge flow rate is controlled by optional control valve 27, so that the supply and discharge flow rates may be controlled independently of each other; when the optional hydraulic actuator 13 is a specific hydraulic actuator which needs the back pressure reduction, the controller 11 outputs control signal to position optional control valve 27 in the back pressure reduction region W at the first operating position X, so that the discharge valve passage 27*f* for the optional control valve 27 may open wide to feed the discharge oil from optional hydraulic actuator 13 into oil tank 12 almost without any resistance, and thus the back pressure to be applied to the specific hydraulic actuator 13 may be surely reduced.

In the first embodiment as configured above, the hydraulic control system of hydraulic excavator 1 is installed with optional control circuit commonly used among multiple optional, selectively mounted, and hydraulic actuators 13: the optional control circuit is configured to be installed with optional first and second flow control valves 32, 33 for controlling the supply flow rate from first and second hydraulic pumps A, B to optional hydraulic actuator 13 and optional control valve 27 for controlling discharge flow rate from optional hydraulic actuator 13 to oil tank 12 as well as changing over supply/discharge directions of hydraulic oil, so that the supply and discharge flow rates for the optional hydraulic actuator 13 may be controlled independently of each other: here, at the first operating position X of the optional control valve 27, normal control region V, where the discharge valve passage 27*f* from the optional hydraulic actuator 13 to the oil tank 12 has an opening area preset out of normal control range Av, and back pressure reduction region W, where the discharge valve passage 27*f* has the back pressure reduction opening Aw whose opening area is larger than the maximum opening area in the normal control range Av, are installed. During the running of the optional hydraulic actuator 13, when the optional hydraulic actuator 13 is specific hydraulic actuator (breaker, for example) which is prespecified to need the back pressure reduction, the controller 11 controlling optional control valve 27 controls to position the optional control valve 27 in the back pressure reduction region W; and when the actuator 13 is not specific hydraulic actuator, the controller 11 controls to position the optional control valve 27 in the normal control region V.

When the optional hydraulic actuator 13 is the specific hydraulic actuator, the discharge oil from the optional hydraulic actuator 13 is to be fed into the oil tank 12 through the discharge valve passage 27*f* for optional control valve 27 positioned in the back pressure reduction region W, and the discharge valve passage 27*f* has the back pressure reduction opening Aw whose opening area is set larger than the maximum opening area in the normal control range Av, thus the discharge oil from the optional hydraulic actuator 13 may be fed with fully reduced back pressure into the oil tank 12. Thus, the present embodiment uses the optional control valve 27 to control the back pressure reduction; when the optional hydraulic actuator 13 is not specific hydraulic actuator, the discharge flow rate from the optional hydraulic actuator 13 is controlled by positioning the optional control valve 27 in the normal control region V where the opening area of discharge valve passage 27*f* is within the normal control range Av, thus the optional control valve 27 controlling the discharge flow rate may also control the back pressure reduction for specific hydraulic actuator without need of dedicated part for back pressure reduction separately, achieving part sharing, cost reduction, and energy saving greatly. This embodiment uses optional flow rate control flow control valves 32, 33 to control supply flow rate to optional hydraulic actuator 13, and uses optional control valve 27 to control discharge flow rate from the optional hydraulic actuator 13 so that the supply and discharge flow rates may be controlled independently of each other: thus controlling supply flow rate to optional hydraulic actuator 13 may be performed accurately regardless of whether the optional control valve 27 is located at either normal control region V or back pressure reduction region W.

As optional flow control valve for controlling supply flow rate for the optional hydraulic actuator 13, this embodiment is further installed with optional first flow control valve 32 for controlling to feed the supply flow for the optional hydraulic actuator 13 from first hydraulic pump A to the optional control valve 27 and optional second flow control valve 33 for controlling to feed the supply flow for the optional hydraulic actuator 13 from second hydraulic pump B to the optional control valve 27. Depending on the supply flow rate required by various optional hydraulic actuators 13 and operating condition of other hydraulic actuator (boom cylinder 8, stick cylinder 9, and bucket cylinder 10 in this embodiment) using the first and second hydraulic pumps A, B as the hydraulic supply source, the pressure oil may be supplied from both or either one of first and second hydraulic pumps A, B to optional hydraulic actuator 13, or a ratio of supply flow rates from first and second hydraulic pumps A, B may be changed easily by using optional first and second flow control valves 32, 33 to control supply flows individually from the first and second hydraulic pumps A, B into optional control valve 13.

Moreover, when the optional hydraulic actuator 13 is specific hydraulic actuator which needs the back pressure reduction, the present embodiment may be configured to use optional relief valve 38, which is connected to optional hydraulic actuator oil passage 36 (another optional hydraulic pressure actuator oil passage) which feeds discharge oil from the specific hydraulic actuator to optional control valve 27, to divide the discharge oil from the specific hydraulic actuator into the discharge valve passage **27*f* for optional control valve 27 in the back pressure reduction region W and tank 12. Here, the optional relief valve 38 is configured in advance to support ultra low relief pressure based on the control signal from the controller 11. When the optional hydraulic actuator 13 is decided as specific hydraulic actuator, the optional control valve 27 is positioned in the back pressure reduction region W at the first operating position X as well as the optional relief valve 38 is set to ultra low pressure. Thus, the discharge oil from the specific hydraulic actuator is divided to be fed into optional control valve 27 positioned in the back pressure reduction region W and optional relief valve 38 set to ultra low relief pressure, so that the discharge oil may flow into the oil tank 12 almost without any resistance, surely reducing the back pressure even if there is a lot of discharge flow from the specific hydraulic actuator. When the optional hydraulic actuator 13 is not specific hydraulic actuator, a relief pressure for the optional relief valve 38 connected to another optional hydraulic actuator oil passage 36 is set appropriately based on the control signal from the controller 11 so that the optional relief valve 38 may work as the relief valve for setting maximum pressure of the another optional hydraulic actuator oil passage 36**.

Figure 5:
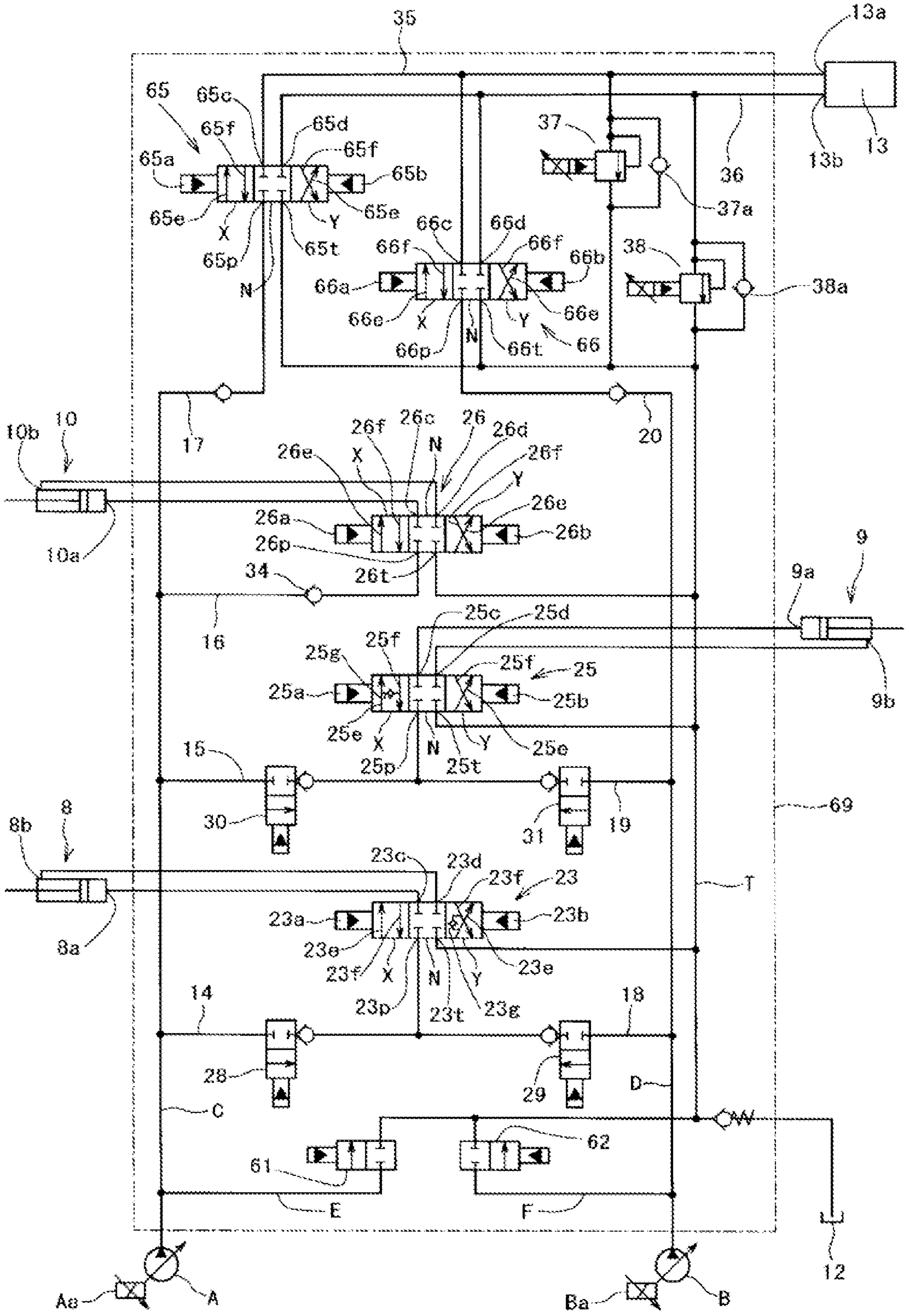
FIG. 5 is a hydraulic circuit diagram illustrating a second embodiment.
Figure 6:
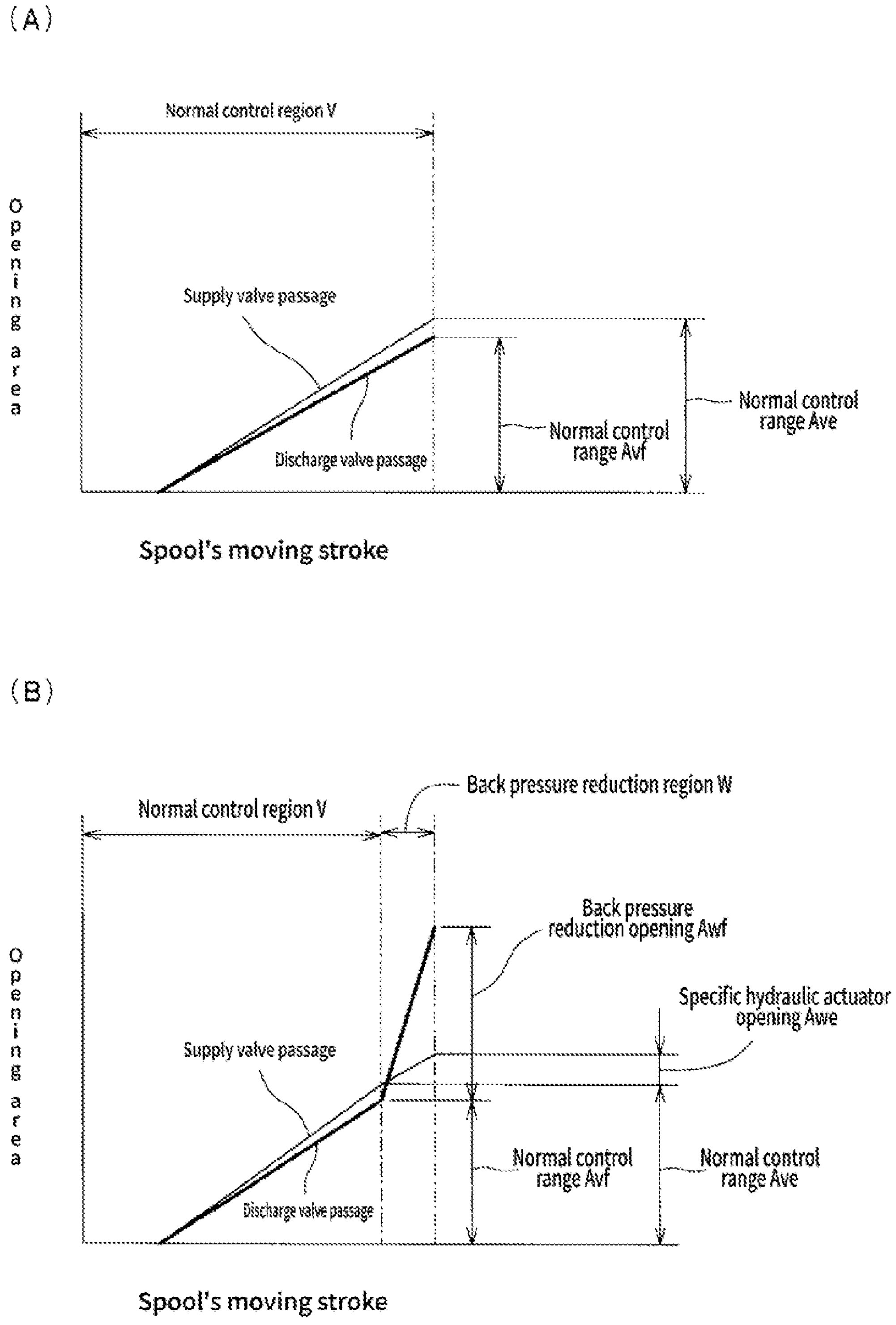
FIG. 6 is a diagram illustrating the second embodiment, (A) is the diagram illustrating the relationship between the spool's moving stroke of the optional first control valve at the first and second operating positions or the spool's moving stroke of the optional second control valve at the second operating position and the opening area of the supply/discharge valve passages, (B) is the diagram illustrating the relationship between the spool's moving stroke of the optional second control valve at the first operating position and the opening area of supply/discharge valve passages.

Now, the explanation is provided below about a second embodiment of the present invention based on the FIGS. 5, 6. The second embodiment differs from the first in optional control circuit controlling optional hydraulic actuator 13, and the other part is the same as the first and has the same sign, so the explanation is omitted about it.

In the second embodiment, optional first and second control valves 65, 66 are disposed which are commonly used among optional first and second supply oil passages 17, 20 respectively branching from first and second pump lines C, D and various optional hydraulic actuators 13.

The optional first control valve 65 is the closed center spool valve for controlling the supply/discharge flow rates for optional hydraulic actuator 13 as well as changing over the supply/discharge directions and comprises first and second pilot ports **65*a*, 65*b* respectively connected to optional first and second proportional solenoid valves (not shown) for outputting pilot pressure based on control signal output from the controller 11, a pump port 65*p* connected via optional first supply oil passage 17 to first hydraulic pump A, a tank port 65*t* connected to tank line T leading to oil tank 12, first actuator port 65*c* connected to first port 13*a* on optional hydraulic actuator 13, and second actuator port 65*d* connected to second port 13*b* on the optional hydraulic actuator 13. When the pilot pressure is not input into both first and second pilot ports 65*a*, 65*b*, the optional control valve 65 is positioned at the neutral position N where oil is neither supplied to nor discharged from the optional hydraulic actuator 13; when the pilot pressure is input into the first pilot port 27*a*, the valve 65 is configured to be changed over to first operating position X to open supply valve passage 65*e* from pump port 65*p* to first actuator port 65*c* and discharge valve passage 65*f* from second actuator port 65*d* to tank port 65*t*: also when the pilot pressure is input into second pilot port 65*b*, the valve 65 is configured to be changed over to second operating position Y to open the supply valve passage 65*e* from the pump port 65*p* to the second actuator port 65*d* and the discharge valve passage 65*f* from the first actuator port 65*c* to the tank port 65*t*. When the valve 65 is positioned at the first or second operating position X or Y, the supply/discharge flow rates for optional hydraulic actuator 13 are configured to be controlled by opening area of supply/discharge valve passages 65*e*, 65*f*, and the opening area is controlled to be increased or decreased depending on the spool's moving stroke associated with the increase or decrease of pilot pressure which is output from optional first and second proportional solenoid valves to the first and second pilot ports 65*a*, 65*b*; here in optional first control valve 65 at first or second operating position X or Y, the whole spool's moving stroke is normal control region V, where the opening area of supply/discharge valve passages 65*e*, 65*f* is increased or decreased within preset normal control ranges Ave, Avf, without any back pressure reduction region W mentioned later (see FIG. 6**(A)).

Similar to the optional first control valve 65, optional second control valve 66 is the closed center spool valve for controlling the supply/discharge flow rates for optional hydraulic actuator 13 as well as changing over the supply/discharge directions and comprises first and second pilot ports **66*a*, 66*b* respectively connected to optional first and second proportional solenoid valves (not shown) for outputting pilot pressure based on control signal output from the controller 11, the pump port 66*p* connected via optional second supply oil passage 20 to second hydraulic pump B, the tank port 66*t* connected to the tank line T, first actuator port 66*c* connected to first port 13*a* on optional hydraulic actuator 13, and second actuator port 66*d* connected to second port 13*b* on the optional hydraulic actuator 13**.

Similar to the optional first control valve 65, when the pilot pressure is input into first and second pilot ports 66*a*, 66*b*, the optional second control valve 66 is configured to be changed over from neutral position N to first and second operating positions X, Y, to open supply valve passage 66*e* from pump port 66*p* to actuator port 66*c* or 66*d* and discharge valve passage 66*f* from actuator port actuator port 66*d* or 66*c* to tank port 66*t*.

As shown in FIG. 6(B), normal control region V and back pressure reduction region W are installed at the first operating position X of the optional second control valve 66. In this case, the back pressure reduction region W is configured to have larger spool's moving stroke from the neutral position N than the stroke for normal control region V. In the normal control region V, the opening area of the supply/discharge valve passages 66*e*, 66*f* is configured to increase gradually within preset normal control ranges Ave, Avf as the spool's moving stroke increases, so that the supply/discharge flow rates for the optional hydraulic actuator 13 are configured to increase gradually as the spool's moving stroke increases. Meanwhile, in the back pressure reduction region W, the discharge valve passage 66*f* has the back pressure reduction opening Awf whose opening area is set to further larger than the maximum opening area in normal control range Avf, so that the discharge oil from the optional hydraulic actuator 13 is to be fed into the oil tank 12 without any flow control and almost without any resistance. When the optional hydraulic actuator 13 is specific hydraulic actuator which needs the back pressure reduction, similar to the breaker for example, the back pressure applied to the specific hydraulic actuator may be to be reduced by positioning the optional second control valve 66 in the back pressure reduction region W at the first operating position X. The opening area of supply valve passage 66*e* in the back pressure reduction region W is set to the specific hydraulic actuator opening Awe, the specific hydraulic actuator opening Awe has the opening area which is preset to supply adapted flow rate for the specific hydraulic actuator (breaker, for example): in the present embodiment, the opening area is set to a little larger than maximum opening area in the normal control range Ave.

Similar to first and second operating positions X, Y of optional first control valve 65, the whole region of second operating position Y of optional second control valve 66 is normal control region V without any back pressure reduction region W: the supply/discharge flow rates for optional hydraulic actuator 13 are to be controlled by the opening area of supply/discharge valve passages 66*e*, 66*f* to be increased or decreased within normal control ranges Ave, Avf depending on the spool's moving stroke (see FIG. 6(A)).

Note that, in the second embodiment, the optional second control valve 66 corresponds to optional control valve according to claim 3 of this invention and optional first control valve according to claim 4. The optional first control valve 65 also corresponds to optional second control valve according to claim 4 of this invention but not corresponds to optional control valve according to claim 3. Moreover, in the second embodiment, first hydraulic pump A corresponds to second hydraulic pump of claim 4 of this invention and second hydraulic pump B corresponds to first hydraulic pump of claim 4.

Next, the explanation is provided about control by the controller 11 when the optional hydraulic actuator 13 is mounted.

The controller 11 first decides based on the notification signal from optional hydraulic actuator notification means 59 whether the optional hydraulic actuator 13 is specific hydraulic actuator (breaker, for example) which needs the back pressure reduction. When the actuator 13 is not decided as specific hydraulic actuator, a control method is decided according to each optional hydraulic actuator 13. For example, when the optional hydraulic actuator 13 requires two-way pressure oil supply, the controller 11 controls to change over the optional first and second control valves 65, 66 to first and second operating positions X, Y based on the operating direction of the optional manipulator; when the optional hydraulic actuator 13 requires one-way pressure oil supply only, the controller 11 controls to change over the valves to either one only of the first and second operating positions X, Y (to first operating position X according to the present embodiment). Depending on the supply flow rate needed by optional hydraulic actuator 13 and operating condition of other hydraulic actuator installed in the hydraulic excavator 1, the controller 11 decides whether to supply the pressure oil from both or either one of first and second hydraulic pumps A, B to the optional hydraulic actuator 13; when the pressure oil is supplied from both of hydraulic pumps A, B, both optional first and second control valves 65, 66 are controlled to be positioned at operating position X or Y, and when the pressure oil is supplied from either one of the first and second hydraulic pumps A, B, a first of optional first and second control valves 65, 66 is controlled to be positioned at first or second operating position X or Y, and a second of optional control valves 65, 66 is controlled to be positioned at neutral position N.

Moreover, when the optional hydraulic actuator 13 is not specific hydraulic actuator, the controller 11 calculates target supply flow rate feeding respectively from first and second hydraulic pump A, B to optional hydraulic actuator 13. The controller 11 outputs control signal to optional first and second proportional solenoid valves to control the opening area of supply valve passages 65*e*, 66*e* for optional first and second control valves 65, 66 so that the output flow rate from the optional first and second control valves 65, 66 may correspond to the target supply flow rate. Here, the spool's moved position which controls the supply flow rate by changing the opening area of supply valve passages 65*e*, 66*e* also controls the discharge flow rate by changing the opening area of discharge valve passages 65*f*, 66*f*; when the optional second control valve 66 is controlled to be positioned at first operating position X, the valve 66 is controlled to be positioned in the normal control region V where the opening area of supply/discharge valve passages 66*e*, 66*f* may be within normal control range Ave, Avf. As mentioned above, in the first and second operating positions X, Y of optional first control valves 65 and the second operating position Y of optional second control valve 66, the whole spool's moving stroke is normal control region V.

Meanwhile, when optional hydraulic actuator 13 is decided as specific hydraulic actuator, the controller 11 outputs the control signal to optional second proportional solenoid valve to position the optional second control valve 66 in the back pressure reduction region W at the first operating position X. The optional second control valve 66 positioned in the back pressure reduction region W sets the opening area of supply/discharge valve passages 66*e*, 66*f* to that of the specific hydraulic actuator opening Awe and back pressure reduction opening Awf: thus the supply flow rate to specific hydraulic actuator 13 is controlled to be adapted for the actuator 13 and the discharge oil from optional hydraulic actuator 13 is controlled to be fed into oil tank 12 almost without any resistance, preventing back pressure on the optional hydraulic actuator 13.

Furthermore, when the optional hydraulic actuator 13 is the specific hydraulic actuator, the controller 11 controls optional first control valves 65 to be positioned at neutral position N, so that the pressure oil is supplied only from second hydraulic pump B to specific hydraulic actuator without being supplied from first hydraulic pump A, and when the boom's/stick's/bucket's/optional manipulators are operated, the pressure oil is supplied only from first hydraulic pump A to boom/stick/bucket cylinders 8, 9, and 10. That is, as described in the first embodiment, the bucket cylinder 10 is configured such that the pressure oil is supplied from first hydraulic pump A only, and the boom/stick cylinders 8, 9 may be controlled such that the pressure oil may be supplied from first hydraulic pump A only by opening boom's/stick's first flow control valves 28, 30 and closing boom's/stick's second flow control valves 29, 31. Thus, by supplying the pressure oil only from second hydraulic pump B to specific hydraulic actuator and supplying the pressure oil only from first hydraulic pump A to boom/stick/bucket cylinders 8, 9, and 10, the supply flow rate to specific hydraulic actuator may be ensured independently of another hydraulic actuator (boom/stick/bucket cylinders 8, 9, and 10) driving the front working part 4, the supply flow rate to another hydraulic actuator may also be ensured, and better interlocking may be ensured when specific and another hydraulic actuators are operated at the same time.

In the second embodiment as configured above, the optional control circuit is installed with optional second control valve 66 for controlling the supply flow rate from second hydraulic pump B to optional hydraulic actuator 13 and controlling discharge flow rate from the optional hydraulic actuator 13 to oil tank 12 as well as changing over supply/discharge directions of hydraulic oil for the optional hydraulic actuator 13: the first operating position X of the optional second control valve 66 is installed with normal control region V, where the discharge valve passage **66*f* from the optional hydraulic actuator 13 to the oil tank 12 has an opening area preset out of normal control range Avf, and back pressure reduction region W, where the discharge valve passage 66*f* has the back pressure reduction opening Awf whose opening area is larger than the maximum opening area in the normal control range Avf. During the running of the optional hydraulic actuator 13, when the optional hydraulic actuator 13 is specific hydraulic actuator (breaker, for example) which is prespecified to need the back pressure reduction, the controller 11 controlling optional second control valve 66 controls to position the optional second control valve 66 in the back pressure reduction region W; and when the actuator 13 is not specific hydraulic actuator, the controller 11 controls to position the optional second control valve 66** in the normal control region V.

When the optional hydraulic actuator 13 is the specific hydraulic actuator, the discharge oil from the optional hydraulic actuator 13 is to be fed into the oil tank 12 through discharge valve passage **66*f* for optional second control valve 66 positioned in the back pressure reduction region W, and the discharge valve passage 66*f* in the back pressure reduction region W has the back pressure reduction opening Awf whose opening area is set larger than the maximum opening area in the normal control range Avf, thus the discharge oil from the optional hydraulic actuator 13 may be fed with fully reduced back pressure into the oil tank 12. Thus, the back pressure reduction for the specific hydraulic actuator may be performed by making use of the optional second control valve 66 for controlling the supply/discharge flow rates for the optional hydraulic actuator 13** and changing over the supply/discharge directions without need of dedicated part for back pressure reduction separately, achieving part sharing, cost reduction, and energy saving greatly.

In the second embodiment, the optional control circuit is installed with the optional second control valve 66 as well as optional first control valve 65, which is connected to first hydraulic pump A, controls the supply flow rate from the first hydraulic pump A to the optional hydraulic actuator 13, controls the discharge flow rate from the optional hydraulic actuator 13 to oil tank 12, and changes over supply/discharge directions of hydraulic oil for the optional hydraulic actuator 13; the optional first control valve 65 is configured to be installed with normal control region V only and not to be installed with back pressure reduction region W, preventing back pressure reduction. When the optional hydraulic actuator 13 is not specific hydraulic actuator, the optional first control valve 65 and optional second control valve 66 positioned in normal control region V are available to provide supply/discharge control according to various optional hydraulic actuators 13; when the optional hydraulic actuator 13 is specific hydraulic actuator, the optional second control valve 66 only, which is available to use in back pressure reduction, controls the supply/discharge of hydraulic oil for the specific hydraulic actuator, and a hydraulic pump other than second hydraulic pump B where the optional second control valve 66 is connected, that is the first hydraulic pump A, feeds pressure oil to other hydraulic actuator (boom cylinder 8, stick cylinder 9, and bucket cylinder 10 in this embodiment). Thus, the supply flow rate supplied to specific hydraulic actuator may be ensured regardless of running of another hydraulic actuator and the supply flow rate supplied to another hydraulic actuator may also be ensured, ensuring good interlocking when specific and another hydraulic actuators are operated simultaneously.

In the second embodiment, similar to first embodiment, when the optional hydraulic actuator 13 is specific hydraulic actuator which needs the back pressure reduction, the optional relief valve 38, which is connected to optional hydraulic actuator oil passage 36 for feeding discharge oil from the specific hydraulic actuator into optional second control valve 66, may be obviously configured to divide the discharge oil from the specific hydraulic actuator into discharge valve passage **66*f* for optional second control valve 66 in the back pressure reduction region W and oil tank 12**, thus enabling further reduction of resistance and back pressure surely.

Figure 7:
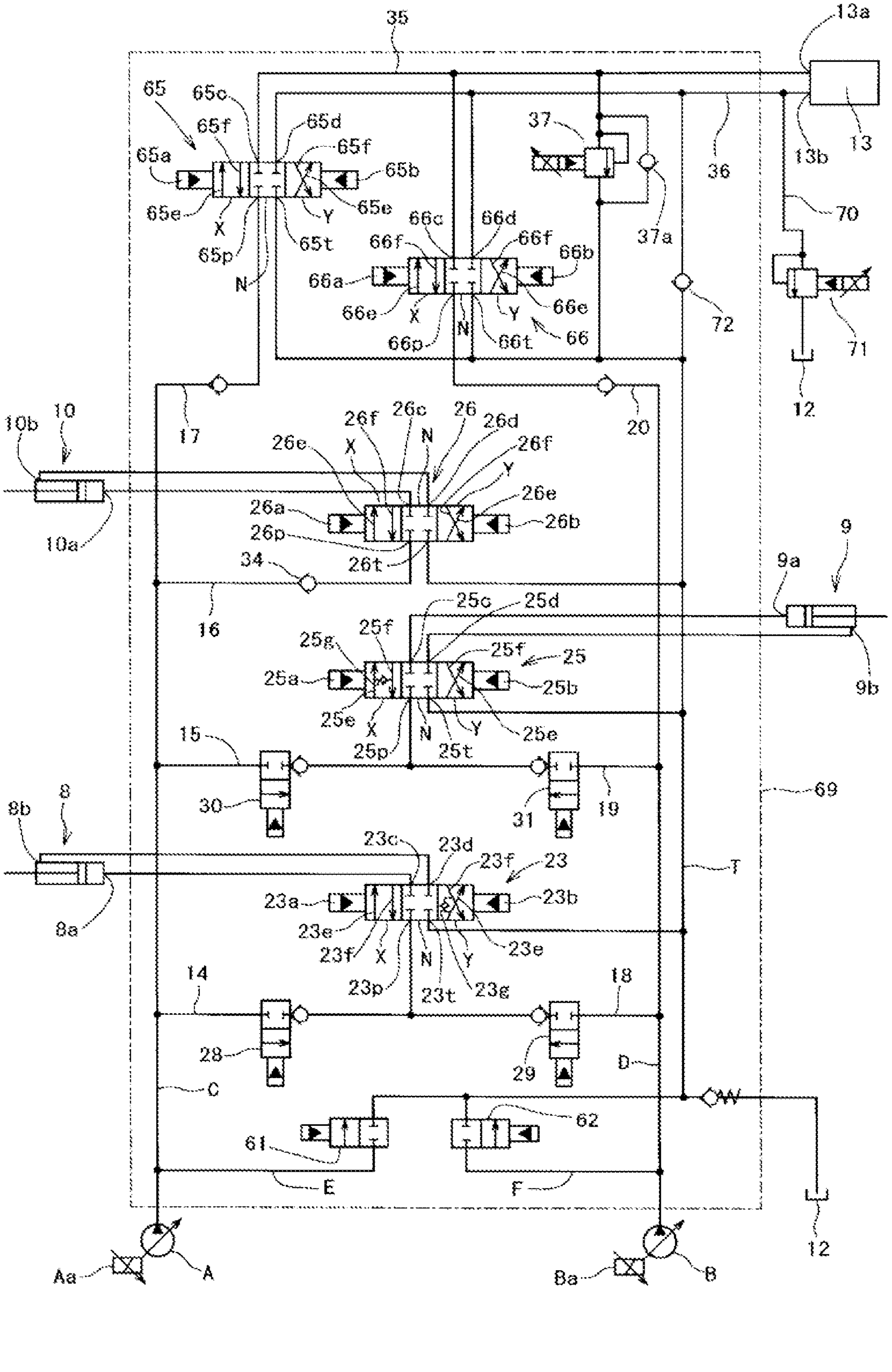
FIG. 7 is the hydraulic circuit diagram illustrating a third embodiment.

The present invention is obviously not restricted to the first and second embodiments: for example, in the first and second embodiments, the optional relief valve is disposed on a valve block 69, where various boom's/stick's/bucket'/optional control valves, various boom's/stick's/optional flow control valves, first and second bleed valves, and others are installed, and as third embodiment shown in FIG. 7, the optional relief valve connected to an oil passage for feeding discharge oil from specific hydraulic actuator into optional control valve may be disposed outside of the valve block 69. Note that the third embodiment differs in some configurations from the second embodiment, so same part as the second embodiment has the same sign and its explanation is omitted.

That is, in the third embodiment, when the optional hydraulic actuator 13 is specific hydraulic actuator, a bypass oil passage 70 leading to oil tank 12 without passing through the valve block 69 is connected to optional hydraulic actuator oil passage 36 for feeding discharge oil from the specific hydraulic actuator into optional second control valve 66; and optional relief valve 71, which may change the preset pressure based on the control signal from the controller 11, is disposed in the bypass oil passage 70. The optional relief valve 71 is configured to set ultra low relief pressure based on the control signal from the controller 11; when optional hydraulic actuator 13 is decided as specific hydraulic actuator which needs the back pressure reduction, similar to second embodiment, the controller 11 positions the optional second control valve 66 in the back pressure reduction region W at the first operating position X and sets the pressure of the optional relief valve 71 to ultra low. Thus, the discharge oil from specific hydraulic actuator is divided to be fed into optional second control valve 66 positioned in the back pressure reduction region W and optional relief valve 71 set to be ultra low relief pressure, so that the discharge oil may flow into the oil tank 12 almost without any resistance; here, the optional relief valve 71 is disposed in the bypass oil passage 70 leading to oil tank 12 from specific hydraulic actuator without passing through the valve block 69, so the discharge oil passing through the optional relief valve 71 flows directly into the oil tank 12 whose pressure is much lower than the tank line T disposed in the valve block 69, and further reduction of resistance is achieved compared when optional relief valve is disposed in the valve block 69. Even if the bypass oil passage 70 and optional relief valve 71 are disposed outside of the valve block 69, the discharge valve passage **66*f* for optional second control valve 66 positioned in the back pressure reduction region W has the back pressure reduction opening Awf whose opening area is set larger than the opening area within the normal control range Avf, so the discharge flow passing through the bypass oil passage 70 and optional relief valve 71 may be less, achieving a downsizing of pipe for bypass oil passage 70 and optional relief valve 71**.

When the optional hydraulic actuator 13 is not specific hydraulic actuator, a relief pressure for optional relief valve 71 disposed in the bypass oil passage 70 is set appropriately based on the control signal from the controller 11 so that the optional relief valve 71 may work as the relief valve for setting maximum pressure of optional hydraulic actuator oil passage 36.

Also the third embodiment is installed with bypass oil passage 70 and optional relief valve 71 outside of the valve block 39 in place of optional relief valve 38 in the second embodiment, the first embodiment may obviously be installed with these bypass oil passage 70 and optional relief valve 71. Also, 72 in FIG. 7 is a make-up check valve.

In the first to third embodiments, two, that is, first and second hydraulic pumps A, B are installed as hydraulic supply source for optional hydraulic actuator, this invention may be obviously implemented in cases where only one hydraulic pump is installed.

INDUSTRIAL APPLICABILITY

This invention may be exploited in cases when installing optional hydraulic actuator which needs the back pressure reduction, similar to the breaker, in working machines such as hydraulic excavator.

The invention claimed is:

1. A hydraulic control system in a working machine installed with an optional control circuit commonly used among multiple optional hydraulic actuators selectively mounted to the working machine; wherein the optional control circuit is installed with an optional flow control valve controlling a supply flow rate from a hydraulic pump to the optional hydraulic actuator, and an optional control valve controlling a discharge flow rate from the optional hydraulic actuator to an oil tank as well as changing over supply/discharge directions of hydraulic oil for the optional hydraulic actuator, so that the supply and discharge flow rates of the optional hydraulic actuator may be configured to be controlled independently of each other; wherein at an operating position of the optional control valve, a normal control region, where a discharge valve passage from the optional hydraulic actuator to the oil tank has an opening area preset out of normal control range, and a back pressure reduction region are provided where the discharge valve passage has a back pressure reduction opening whose opening area is larger than a maximum opening area in the normal control range; wherein the optional control circuit is installed with a controller, which, when the optional hydraulic actuator is a specific hydraulic actuator which is prespecified to need a back pressure reduction, positions the optional control valve in the back pressure reduction region during a running of the optional hydraulic actuator, and when the optional hydraulic actuator is not the specific hydraulic actuator, positions the optional control valve in the normal control region.

2. The hydraulic control system in the working machine of claim 1 comprising: first and second hydraulic pumps as hydraulic supply source for optional hydraulic actuator and other hydraulic actuator installed in the working machine; wherein, as optional flow control valve, the optional control circuit comprises optional first flow control valve controlling to feed a supply flow for optional hydraulic actuator from the first hydraulic pump to optional control valve and optional second flow control valve controlling to feed the supply flow for optional hydraulic actuator from the second hydraulic pump to optional control valve.

3. A hydraulic control system in a working machine installed with an optional control circuit commonly used among multiple optional hydraulic actuators selectively mounted to the working machine; wherein the optional control circuit is installed with an optional control valve controlling a supply flow rate from hydraulic pump to the optional hydraulic actuator and a discharge flow rate from the optional hydraulic actuator to an oil tank as well as changing over supply/discharge directions of hydraulic oil for the optional hydraulic actuator; wherein at the operating position of the optional control valve, a normal control region, where a discharge valve passage from the optional hydraulic actuator to the oil tank has an opening area preset out of normal control range, and a back pressure reduction region are provided where the discharge valve passage has a back pressure reduction opening whose opening area is larger than a maximum opening area in the normal control range; wherein the optional control circuit is installed with a controller, which, when the optional hydraulic actuator is a specific hydraulic actuator which is prespecified to need a back pressure reduction, positions the optional control valve in the back pressure reduction region during a running of the optional hydraulic actuator, and when the optional hydraulic actuator is not the specific hydraulic actuator, positions the optional control valve in the normal control region.

4. The hydraulic control system in the working machine of claim 3 comprising first and second hydraulic pumps as hydraulic supply source for optional hydraulic actuator and other hydraulic actuator installed in the working machine; wherein the optional control circuit is installed with an optional first control valve, which is connected to first hydraulic pump, controls the supply flow rate from the first hydraulic pump to the optional hydraulic actuator and the discharge flow rate from the optional hydraulic actuator to the oil tank, and changes over supply/discharge directions of hydraulic oil for the optional hydraulic actuator, an optional second control valve, which is connected to second hydraulic pump, controls the supply flow rate from the second hydraulic pump to the optional hydraulic actuator and the discharge flow rate from the optional hydraulic actuator to the oil tank, and changes over supply/discharge directions of hydraulic oil for the optional hydraulic actuator; wherein either one of the optional first and second control valves, which is connected to either one of the first and second hydraulic pumps, is the optional control valve defined in claim 3, which is configured to be installed with normal control region and back pressure reduction region, and the other of the optional first and second control valves, which is connected to the other of the first and second hydraulic pumps, is configured to be installed with normal control region only and not to be installed with back pressure reduction region; wherein, when the optional hydraulic actuator is the specific hydraulic actuator, only either one of the optional first and second control valves is configured to control supply/discharge of hydraulic oil for the specific hydraulic actuator and the other hydraulic actuator installed in the working machine is configured to be supplied with pressure oil from the other of the hydraulic pumps.

* * * * *